US012169497B2

(12) United States Patent
Huh et al.

(10) Patent No.: US 12,169,497 B2
(45) Date of Patent: *Dec. 17, 2024

(54) SYSTEM AND METHODS FOR CONTEXT AWARE SEARCHING

(71) Applicant: Thomson Reuters Enterprise Centre GmbH, Zug (CH)

(72) Inventors: Domingo Huh, Toronto (CA); Julian Brooke, Vancouver (CA); Elnaz Davoodi, Toronto (CA); Jack G. Conrad, Eagan, MN (US)

(73) Assignee: Thomson Reuters Enterprise Centre GmbH, Zug (CH)

( * ) Notice: Subject to any disclaimer, the term of this patent is extended or adjusted under 35 U.S.C. 154(b) by 0 days.

This patent is subject to a terminal disclaimer.

(21) Appl. No.: 17/531,693

(22) Filed: Nov. 19, 2021

(65) Prior Publication Data

US 2022/0083560 A1    Mar. 17, 2022

Related U.S. Application Data

(63) Continuation of application No. 16/181,729, filed on Nov. 6, 2018, now Pat. No. 11,222,027.

(Continued)

(51) Int. Cl.
  *G06F 16/24*      (2019.01)
  *G06F 16/2457*    (2019.01)
  (Continued)

(52) U.S. Cl.
  CPC ........ *G06F 16/24578* (2019.01); *G06F 16/38* (2019.01); *G06F 16/93* (2019.01)

(58) Field of Classification Search
  CPC ........ G06F 16/245; G06F 16/78; G06F 16/38; G06F 16/93
  (Continued)

(56) References Cited

U.S. PATENT DOCUMENTS 6,038,560 A * 3/2000 Wical .................... G06F 16/367
                                                707/999.005
6,101,503 A * 8/2000 Cooper ................. G06F 40/143
                                                707/999.102

(Continued)

FOREIGN PATENT DOCUMENTS

WO    WO2007002800 A1 *  1/2007
WO    WO2007002800 A2 *  1/2007

OTHER PUBLICATIONS

Lucas, Christopher, "Patent Semantics: Analysis, Search and Visualization of Large Text Corpora"; 2004.*

(Continued)

*Primary Examiner* — Daniel A Kuddus
(74) *Attorney, Agent, or Firm* — Norton Rose Fulbright US LLP

(57) ABSTRACT

The present disclosure relates to methods and systems for providing context aware searching using concept markers. Embodiments provide concept markers configured to facilitate the identification and refinement of relevant content associated with a query with a high degree of precision. In embodiments, in response to a user query, documents and concept markers relevant to the query are determined. The identified documents are associated with the concept markers and are ranked based on the quality of the association. Upon a user selecting at least one of the concept markers, the search results are refined in response. The refining includes re-ranking the documents based on a combination of the original query and the selected concept marker. The suggested concept markers are similarly re-ranked. Accordingly, the techniques disclosed herein provide for a high precision identification of relevant content as well as high precision refining of the search results.

16 Claims, 4 Drawing Sheets

Related U.S. Application Data

(60) Provisional application No. 62/582,571, filed on Nov. 7, 2017.

(51) Int. Cl.
*G06F 16/38* (2019.01)
*G06F 16/93* (2019.01)

(58) Field of Classification Search
USPC ............ 707/727, 728, 729, 730, 731, 748 W
See application file for complete search history.

(56) References Cited

U.S. PATENT DOCUMENTS

| | | | | |
|---|---|---|---|---|
| 6,584,470 B2* | 6/2003 | Veale | ............... | G06F 16/367 707/999.102 |
| 7,809,551 B2* | 10/2010 | Sandor | ............... | G06F 16/313 704/7 |
| 8,386,509 B1* | 2/2013 | Scofield | ............... | G06F 16/9535 707/706 |
| 8,907,978 B2* | 12/2014 | Nielsen | ............... | G06F 3/0482 345/619 |
| 8,907,980 B2* | 12/2014 | Nielsen | ............... | G09G 5/00 345/629 |
| 8,928,693 B2* | 1/2015 | Nielsen | ............... | G06F 3/0482 345/419 |
| 8,994,749 B2* | 3/2015 | Nielsen | ............... | G06F 3/0482 345/629 |
| 2003/0050927 A1* | 3/2003 | Hussam | ............... | G06F 16/34 707/999.005 |
| 2003/0130993 A1* | 7/2003 | Mendelevitch | ............... | G06F 16/355 |
| 2005/0108200 A1* | 5/2005 | Meik | ............... | G06F 16/954 |
| 2006/0200556 A1* | 9/2006 | Brave | ............... | G06F 16/9535 709/224 |
| 2007/0005344 A1* | 1/2007 | Sandor | ............... | G06F 16/313 707/E17.084 |
| 2007/0185858 A1 | 8/2007 | Lu et al. | | |
| 2007/0214154 A1 | 9/2007 | Ducatel et al. | | |
| 2007/0239676 A1* | 10/2007 | Stonehocker | ............... | G06F 16/3325 |
| 2008/0027933 A1* | 1/2008 | Hussam | ............... | G06F 16/904 715/272 |
| 2008/0270366 A1* | 10/2008 | Frank | ............... | G06F 16/29 |
| 2009/0228777 A1* | 9/2009 | Henry | ............... | G06F 16/40 707/999.005 |
| 2011/0007076 A1* | 1/2011 | Nielsen | ............... | G06F 16/2365 345/441 |
| 2011/0279230 A1* | 11/2011 | Nielsen | ............... | G06F 16/29 340/8.1 |
| 2011/0283217 A1* | 11/2011 | Nielsen | ............... | G09G 5/00 715/771 |
| 2011/0285749 A1* | 11/2011 | Nielsen | ............... | G09G 5/00 345/629 |
| 2013/0135343 A1* | 5/2013 | Nielsen | ............... | G06F 3/0482 345/619 |
| 2013/0174072 A9* | 7/2013 | Nielsen | ............... | G06F 16/2365 715/771 |
| 2015/0243054 A1* | 8/2015 | Nielsen | ............... | G06T 11/60 345/589 |
| 2015/0332202 A1* | 11/2015 | Nielsen | ............... | G06Q 10/06 705/7.42 |
| 2022/0214437 A1* | 7/2022 | Mochizuki | ............... | G01S 7/06 |

OTHER PUBLICATIONS

International Search Report and Written Opinion issued for PCT Application No. PCT/US2018/059447, dated Jan. 17, 2019; 9 pages.

Lucas, C., "Patent Semantics: Analysis, Search and Visualization of Large Text Corpora," Aug. 20, 2004.

European Patent Office, Communication, Extended European Search Report issued for European Application No. 18876715.6, dated Jun. 14, 2021, 8 pages.

Anonymous: "How to Refine Search Results in Google Scholar," Nov. 19, 2012, XP54981866, retrieved from the Internet: URL:https://www.youtube.com/watch?v=i1cSh2CD_h0.

* cited by examiner

300

311 — Can I deduct mortgage interest on more than one home?

310

Refine your query by selecting one of these suggested concept markers: — 312

320 {
Qualified residence Interest ⊕ | Mortgages ⊕ | Mortgage Interest ⊕ | Acquisition indebtedness ⊕
Home equity indebtedness ⊕ | Equity ⊕ | Indebtedness ⊕ | Qualified housing interest ⊕ | Tax preferences ⊕
Minimum tax ⊕ | Mortgage Interest deduction ⊕ | Alternative minimum tax ⊕ | Less Concepts — 313
}

Candidate Answers from 43,696 results (4.03 seconds)

330 {
Federal Tax Coordinator (RIA)

¶ K-5491 Whether a single loan can include both acquisition indebtedness and home equity indebtedness-mixed-use mortgages under the qri rules.

QRI is interest on acquisition indebtedness or on home equity indebtedness (see ¶K-5471), as follows: Acquisition indebtedness ("home acquisition debt") is debt that's incurred in acquiring, constructing, or substantially improving any qualified residence (¶ K-5474), and is secured by that residence, or that refinances other acquisition indebtedness. The total amount of debt that can be treated as acquisition indebtedness for any period can't exceed $1 million ($500,000 for marrieds filing separately), see ¶ K-5484 et seq.

QRI is interest on acquisition indebtedness or on home equity indebtedness (see ¶ K-5471), as follows: Home equity indebtedness ("home equity debt") is any debt other than acquisition indebtedness that's secured by a qualified residence, and that doesn't exceed the fair market value (FMV) of that residence reduced by any acquisition indebtedness on the residence. The total amount of debt that can be treated as home equity indebtedness on the residence. The total amount of debt that can be treated as home equity indebtedness for any period can't exceed $100,000 ($50,000 for marrieds filing separately), see ¶ K-5490.
}

● ● ●

[ More ] — 350

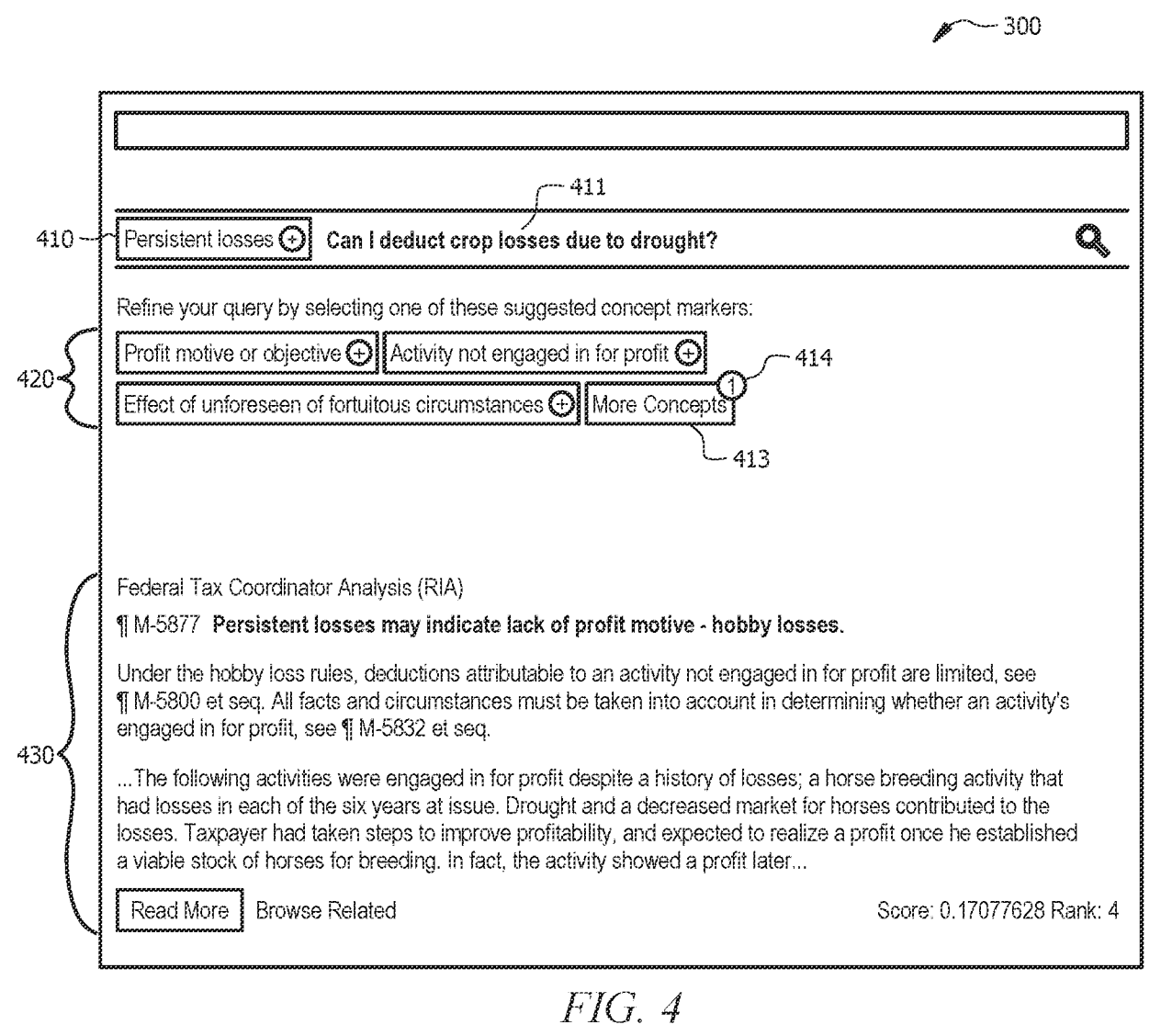

410 — Persistent losses ⊕ | Can I deduct crop losses due to drought?

420 — Refine your query by selecting one of these suggested concept markers:

Profit motive or objective ⊕ | Activity not engaged in for profit ⊕ — 414

Effect of unforeseen of fortuitous circumstances ⊕ | More Concepts — 413

430 — Federal Tax Coordinator Analysis (RIA)

¶ M-5877  Persistent losses may indicate lack of profit motive - hobby losses.

Under the hobby loss rules, deductions attributable to an activity not engaged in for profit are limited, see ¶ M-5800 et seq. All facts and circumstances must be taken into account in determining whether an activity's engaged in for profit, see ¶ M-5832 et seq.

...The following activities were engaged in for profit despite a history of losses; a horse breeding activity that had losses in each of the six years at issue. Drought and a decreased market for horses contributed to the losses. Taxpayer had taken steps to improve profitability, and expected to realize a profit once he established a viable stock of horses for breeding. in fact, the activity showed a profit later...

Read More   Browse Related

Score: 0.17077628  Rank: 4

*FIG. 4*

SYSTEM AND METHODS FOR CONTEXT AWARE SEARCHING

CROSS-REFERENCE TO RELATED APPLICATION

The present application is a continuation of U.S. patent application Ser. No. 16/181,729 filed Nov. 6, 2018 and entitled "SYSTEM AND METHODS FOR CONCEPT AWARE SEARCHING," which claims the benefit of U.S. Provisional Application No. 62/582,571, filed Nov. 7, 2017 and entitled "SYSTEM FOR A TAX ANSWER MACHINE," the disclosures of which are incorporated by reference herein in their entirety.

TECHNICAL FIELD

The present subject matter is directed generally to content searching and more, and more particularly to generating and utilizing context and concept-based data in database searches.

BACKGROUND

Data is the lifeblood of the knowledge economy of today's world. There is, however, a large amount of data available in almost any subject matter area. Identifying relevant data from amongst the available data presents a significant challenge. In existing knowledge search systems, natural language queries are often preferred. In such systems, a user may ask a question or questions, and the system attempts to identify relevant information to address the questions. However, in these systems there is often a disconnect between what the user knows, the question that is asked, and the content data. This disconnect can be the result of the user not knowing particular terms of art or missing important concepts in the query which are essential to finding the most relevant answers. These existing systems may rely on question-answer pairs, in which a potential question is paired with a corresponding answer. When a user submits a known question, the system provides the paired answer to the user. However, these systems are deficient, as they lack the functionality to address deviations from the known question. Thus, when the question submitted by the user is not one of the known questions with a paired answer, the existing systems are either unable to provide an answer, may answer a question deemed to be close to the original query, or may suggest a different question from amongst the known questions. These deficiencies make existing systems inefficient, inflexible, and unable to adapt to a user's needs.

Additionally, the submitted question may be a complex question with multiple answers. Traditionally, users have had to formulate the initial query, review the results and iteratively refine the search by editing the query and resubmitting it, or by using category filters and/or tags with minimal system-generated assistance. However, using category filters and/or tags presents problems in that the tags merely filter out content that is not associated with the tag, without consideration as to how the selection of the tag may affect the original query.

SUMMARY

The present application relates to systems and methods for implementing context aware searching using concept markers configured to leverage a user's knowledge of a submitted search query's context and a system's knowledge of the stored content with respect to the context. In accordance with embodiments of the present disclosure, concept markers provide a mechanism to identify and refine relevant content associated with a user query with a higher degree of precision. In response to a user query, documents and concept markers relevant to the query are determined. The concept markers are associated with the identified documents. Upon a user selecting at least one of the concept markers, the original search results are refined in response. The search results may be refined by re-ranking the documents based on a combination of the original query and the selected concept marker. The suggested concept markers may similarly be updated and re-ranked. As such, the techniques disclosed herein provide for better performance in identifying relevant content and refining the search results.

It is noted that the concept markers described herein are distinct from tags. As discussed above, tags merely involve faceting in which a binary determination is made as to whether the tag is present or not (e.g., whether a match for the tag is found). In contrast, concept markers as described herein involve a more sophisticated approach in which the quality of the match is determined, and the concept markers associated with the documents identified by a query are ranked based on the quality of the match. The distinction is also highlighted when it is considered that when dealing with tags, a search result could be so refined by applying several tags so as to filter out every document, leaving no documents to be presented to the user. In contrast, applying concept markers, as disclosed herein, has the effect of refining and/or re-ranking of the documents/content identified by the query, as well as re-ranking the concept marker lists. When dealing with concept markers, the search results are refined to produce an improved and more accurate result, rather than merely being filtered to remove results.

In one embodiment, a method of refining and/or re-ranking search results may be provided. The method may include receiving a query from a user terminal and identifying documents relevant to the query, the documents being part of a document collection. The method may also include analyzing the documents relevant to the query to determine concept markers assigned to each document in the documents. Each concept marker of the assigned concept markers indicates a level of relevance of an associated concept to a document having the respective concept marker assigned thereto. The method may further include generating search results for the query. The search results include the identified documents and the generating includes adding selectable concept markers corresponding to the assigned concept markers to the search results. The method may also include refining the search results based on at least one selected concept marker from among the selectable concept markers.

In other embodiments, a method of assigning concept markers to documents in a document collection may be provided. The method may include generating a list of master concept markers associated with the document collection and processing documents in the document collection to identify relevant concepts associated with documents. The method may further include assigning concept markers to each document in the document collection based on a respective identified relevant concept and the list of master concept markers. The assigned concept markers correspond to master concept markers in the list of master concept markers. Each concept marker of the assigned concept markers indicates a level of relevance of the associated relevant concept to the document having the respective concept marker assigned thereto. The method may also include generating a list of selectable concept markers based on the assigned concept markers in response to receiving a query, providing the list of selectable concept markers as part of search results in response to the query, and refining the search results based on at least one selected concept marker from among the selectable concept markers.

In yet other embodiments, a system for refining and/or re-ranking search results may be provided. The system may include a concept marker assigner configured to generate a list of master concept markers associated with a document collection, process documents in the document collection to identify relevant concepts associated with documents, and assign concept markers to each document in the document collection based on a respective identified relevant concept and the list of master concept markers. The assigned concept markers correspond to concept markers in the list of master concept markers, and each concept marker of the assigned concept markers indicates a level of relevance of the associated relevant concept to a document having the respective concept marker assigned thereto. The system may also include a query processor configured to receive a query from a user terminal and a search engine module configured to process the query, identify search parameters, and identify documents relevant to the query. The identified documents may be part of the document collection, and, in some embodiments, may be ranked relative to each other. The system may further include a concept marker recommender configured to analyze the documents relevant to the query to determine concept markers that have been assigned to each document in the documents to generate results for the query. The results for the query may include the documents identified by the search engine module, and the concept markers, determined by the CM recommender, as selectable concept markers. In embodiments, the system may include a re-ranker module configured to rank the selectable concept markers relative to each other. The re-ranker module and the concept marker recommender may be further configured to cooperatively refine the results, which may include re-ranking the documents and the determined concept markers, based on at least one selected concept marker from among the selectable concept markers.

It is noted that aspects of the present disclosure may be implemented collectively in an OFFLINE process and an ONLINE process. For example, in a particular implementation, an OFFLINE process may include operations for generating, assigning, and publishing concept markers, and an ONLINE process may include operations for recommending and re-ranking concept markers. However, it will be appreciated that OFFLINE and ONLINE as discussed herein are not limited to processes being implemented or executed online or offline. Rather, the distinction is a functional one. In a sense, the OFFLINE/ONLINE distinction may refer to where a particular process is taking place, the former referring to a backend process with respect to the user, and the latter referring to a user-facing process.

The foregoing broadly outlines the various aspects and technical advantages of the present invention in order that the detailed description of the invention that follows may be better understood. Additional features and advantages of the invention will be described hereinafter which form the subject of the claims of the invention. It should be appreciated by those skilled in the art that the conception and specific embodiment disclosed may be readily utilized as a basis for modifying or designing other structures for carrying out the same purposes of the present invention. It should also be realized by those skilled in the art that such equivalent constructions do not depart from the spirit and scope of the invention as set forth in the appended claims. The novel features which are believed to be characteristic of the invention, both as to its organization and method of operation, together with further objects and advantages will be better understood from the following description when considered in connection with the accompanying figures. It is to be expressly understood, however, that each of the figures is provided for the purpose of illustration and description only and is not intended as a definition of the limits of the present invention.

BRIEF DESCRIPTION OF THE DRAWINGS

For a more complete understanding of the present invention, reference is now made to the following descriptions taken in conjunction with the accompanying drawings, in which:

FIG. 3 shows an example graphical user interface (GUI) configured in accordance with embodiments of the present disclosure; and FIG. 4 shows another example of a GUI in accordance with embodiments of the present disclosure.

DETAILED DESCRIPTION

To address the deficiencies and limitations of existing search systems, various aspects of the present disclosure are directed to systems and techniques for improving search systems to identify and refine relevant content related to a search using concept markers that are ranked by relevance and are used to rank and refine the relevant content that is presented to the user. As noted throughout the present application, the techniques disclosed herein configure the system to leverage a user's awareness and knowledge of a submitted search query's context and a system's knowledge of the stored content with respect to the context to provide highly precise results. The result of the application of aspects disclosed herein is a system that is more efficient, flexible, and able to leverage the contextual knowledge of the user and the content source.

Thus, it should be appreciated that the techniques and systems disclosed herein provide a technical solution to technical problems existing in the conventional industry practice of search systems. Furthermore, the techniques and systems disclosed herein embody a distinct process and a particular implementation that provides an improvement to existing computer systems by providing the computer systems with new capabilities and functionality for leveraging relevantly ranked concept markers in order to identify, refine, and/or re-rank search results to provide to a user more relevant content in the top ranks, which prior art computer systems do not possess.

Figure 1:
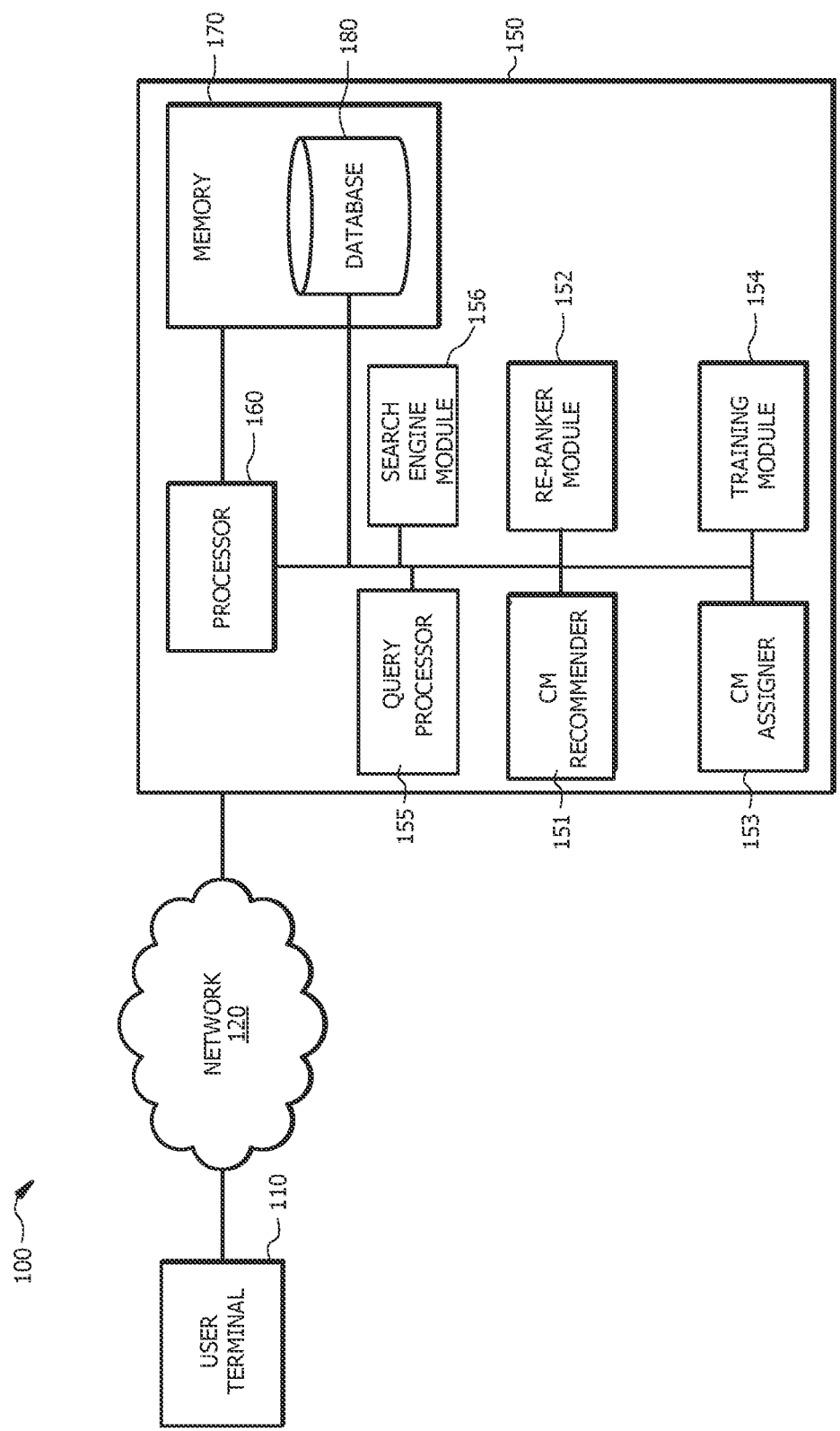
FIG. 1 shows a system configured to perform operations in accordance with embodiments of the present disclosure.

FIG. 1 is a block diagram of an exemplary system 100 configured with capabilities and functionality for identifying relevant search results using concept markers in accordance with embodiments of the present application. As shown in FIG. 1, system 100 may include at least one user terminal 110 and server 150. These components may cooperatively operate to provide functionality in accordance with the discussion herein. In some aspects, server 150 and user terminal 110 may be communicatively coupled via network 120. Network 120 may include a wired network, a wireless communication network, a cellular network, a cable transmission system, a Local Area Network (LAN), a Wireless LAN (WLAN), a Metropolitan Area Network (MAN), a Wide Area Network (WAN), the Internet, the Public Switched Telephone Network (PSTN), etc., that may be configured to facilitate communications between user terminal 110 and server 150.

User terminal 110 may be implemented as a mobile device, a smartphone, a tablet computing device, a personal computing device, a laptop computing device, a desktop computing device, a computer system of a vehicle, a personal digital assistant (PDA), a smart watch, another type of wired and/or wireless computing device, or any part thereof. User terminal 110 may be configured to provide a graphical user interface (GUI) via which a user may be allowed to input a query. The query may be communicated to server 150 over network 120.

Server 150 may be configured to receive the query, process the query, and provide relevant search results in accordance with aspects of the present disclosure, as described in more detail below. Although FIG. 1 shows a single server 150, it will be appreciated that server 150 and its individual functional blocks may be implemented as a single device or may be distributed over multiple devices having their own processing resources, whose aggregate functionality may be configured to perform operations in accordance with the present disclosure. In some embodiments, server 150 may be implemented, wholly or in part, on a cloud-based system. Furthermore, those of skill in the art would recognize that although FIG. 1 illustrates components of server 150 as single blocks, the implementation of the components and of server 150 is not limited to a single component and, as described above, may be distributed over several devices or components.

Server 150 may include processor 160, memory 170, concept marker (CM) recommender 151, re-ranker module 152, CM assigner 153, training module 154, query processor 155, and search engine module 156. It is noted that the various components of server 150 are illustrated as a single and separate components in FIG. 1. However, it will be appreciated that each of the various components of server 150 may be a single component (e.g., a single application, server module, etc.), may be functional components of a same component, or the functionality may be distributed over multiple devices/components. In such aspects, the functionality of each respective component may be aggregated from the functionality of multiple modules residing in a single, or in multiple devices.

In some aspects, processor 160 may comprise a processor, a microprocessor, a controller, a microcontroller, a plurality of microprocessors, an application-specific integrated circuit (ASIC), an application-specific standard product (ASSP), or any combination thereof, and may be configured to execute instructions to perform operations in accordance with the disclosure herein. In some aspects, implementations of processor 160 may comprise code segments (e.g., software, firmware, and/or hardware logic) executable in hardware, such as a processor, to perform the tasks and functions described herein. In yet other aspects, processor 160 may be implemented as a combination of hardware and software. Processor 160 may be communicatively coupled to memory 170.

Memory 170 may comprise read only memory (ROM) devices, random access memory (RAM) devices, one or more hard disk drives (HDDs), flash memory devices, solid state drives (SSDs), other devices configured to store data in a persistent or non-persistent state, network memory, cloud memory, local memory, or a combination of different memory devices. Memory 170 may store instructions that, when executed by processor 160, cause processor 160 to perform operations in accordance with the present disclosure.

Memory 170 may also be configured to facilitate storage operations. For example, memory 170 may comprise database 180 for storing document collections, concept markers, concept marker assignments, usage metrics, analytics, etc., which system 100 may use to provide the features discussed herein. Database 180 may be integrated into memory 170, or may be provided as a separate module. In some aspects, database 180 may be a single database, or may be a distributed database implemented over a plurality of database modules.

In accordance with aspects of the present disclosure, before concept markers may be put into use in the context of a search by system 100, a set of underlying concepts may be identified, where the underlying relevant concepts may correspond to the concept markers. The concept markers may then be associated to relevant content/documents. CM assigner 153 may be configured to provide this functionality. For example, CM assigner 153 may be configured to provide functionality to create a master CM list, to process documents for CM assignment, and/or to publish the CM assignments to be utilized in the context of a search query by a user. It is noted that CM assigner 153 may cooperatively operate with CM recommender 151, re-ranker module 152, and/or search engine module 156 to provide the functionality discussed herein.

Database 180 and/or another database associated with system 100, such as a third-party database, may contain a number of documents. The documents may include content that is to be searched, and may include a large amount of documents. In some aspects, the documents may be arranged in collections based on various factors. For example, the documents may be arranged in collections based on a jurisdiction, a practice area, a geographic area, a topical area, primary vs. editorial content, a particular context, etc.

In one particular embodiment, CM assigner 153 may be configured to generate a master CM list by deriving concept markers from subject matter experts (SMEs). For example, SMEs may identify relevant key concepts based on a jurisdiction, a geographic area, a topical area, primary vs. editorial content, a particular context, etc. The key concepts identified by the SMEs may be included in the master CM list as concept markers.

CM assigner 153 may also be configured to process documents, e.g., documents in a particular collection, document by document, to determine concept markers, from the master CM list, to be assigned to particular documents based on the processing. The processing may include applying natural language processing (NLP) techniques to the document of interest in order to identify content in the document being examined, such as particular portions of the document, associated with a concept marker in the master CM list. In making the determination to assign a concept marker to a document, CM assigner 153 may perform a string match or fuzzy match in which terms or expressions associated with the concept marker are searched for in the document and, if found, the concept marker is assigned to the document. In some aspects, CM assigner 153 may determine to assign a concept marker to a document by determining whether a collection of relevant terms or expressions, associated with the concept marker, is present in the document. The collection of relevant terms or expressions may be specified in a specific form and/or pattern. In some implementations, CM assigner 153 may apply a threshold-based match, in which the collection of relevant terms or expressions is compared against a threshold to determine if the collection of terms or expressions present in the document at least meets a threshold match. In some cases, the threshold-based match may be based on a prominence of a term or expression in the document as determined by a combination of the location and frequency of the term. For example, a term may be considered a relevant term or expression if the term appears once in the first sentence of the document, or may be required to appear a threshold number of times in non-initial sentences of a non-initial paragraph in order to be considered a relevant term or expression to be assigned as a concept marker.

CM assigner 153 may assign the identified concept markers to the corresponding document. In some aspects, CM assigner 153 may assign every concept marker identified to the processed document. In other aspects, CM assigner 153 may assign a limited set of concept markers to each document. The limited set may be a set of the identified markers. The limited set may be a set with a predetermined number of concept markers for assignment to each document. For example, CM assigner 153 may be configured to assign a set of no more than eight concept markers to each document. In this example, if CM assigner 153, after processing a particular document, identifies ten relevant concept markers, CM assigner 153 will assign only eight of those ten concept markers to the particular document. In some aspects, the set of identified concept markers for a document may be a ranked set. The set may be ranked based on a predetermined relevance of the concept marker, on a frequency of occurrence of the concept marker within the document, on a spread of the concept marker across the document, etc.

In another embodiment, CM assigner 153 may be configured to assign concept markers to documents in a collection based on an index file associated with the collection. SMEs may identify key concepts in a document and may annotate the document's metadata to indicate the identified key concepts associated with particular content of the document. It is noted that this process for identifying key concepts in a document may be implemented manually, using an automatic analysis process, using an artificial intelligence (AI) process, a combination thereof, etc. In some aspects, the key concepts may be indexed to the particular content in the document, and may include known phrases, concepts, contexts, etc., which are indicated as key concepts. In embodiments the "index file" may be used to create the master CM list. CM assigner 153 may utilize a collection's index file to identify the key concepts annotated therein for a particular document. The identified key concepts are then assigned to the document as concept markers. In some aspects, the index file may also be utilized for related collections that may cover similar subject matter as the document collection.

In yet another embodiment, CM assigner 153 may be configured to assign concept markers to documents in a collection based on processing a document's metadata to identify important concepts related to the document. This particular embodiment may be applicable where a document's metadata has not been annotated with a key concept, or an index file does not exist for the document or is insufficient. For example, CM assigner 153 may process a document's metadata, and may identify important concepts based on the document's title, table of contents, and/or other metadata. In some aspects, CM assigner 153 may apply standard unsupervised NLP techniques in order to identify the important concepts.

In some embodiments, CM assigner 153 may be configured to assign concept markers to documents using a hybrid technique that includes a combination of the above techniques. For example, a document collection may have an associated index file. In this case, CM assigner 153 may be configured to assign concept markers to documents in the collection by using the key concepts in the index file associated with the documents in the collection, and also by processing the document's metadata and/or contents. In this case, the concept markers assigned to each of the documents may be a combination of concept markers identified by both techniques. In still another embodiment, CM assigner 153 may be configured to assign concept markers to documents in a collection by facilitating SMEs to manually generate and assign concept markers to each document. This embodiment may be applicable to implementations involving small, manageable document collections.

It is noted that in every embodiment discussed herein, CM assigner 153 may be configured to assign at least one concept marker to every document in a document collection. In some cases, every concept marker in the master CM list may be assigned to at least one document, or there may be master concept markers that are not assigned to any document. CM assigner 153 may be further configured to publish the concept marker assignments for use by system 100 in a search query context, as will be described in more detail below. The publishing of the concept marker assignments may include generating a list of concept markers indexed with associations to respective documents. Alternatively, the list may include those concept markers that have been assigned to at least one document. The concept marker assignment list may be stored in database 180, and may be utilized in a search query context. In some embodiments, the concept marker assignment to a document may include adding a record to the metadata of a document indicating the concept marker assigned to the document. In these cases, each document in a collection may be preserved with a record of each concept marker assigned, as well as any key concept identified by an SME. Publishing the document assignments in these cases may include storing the documents in the collection, with the metadata records, in database 180.

Query processor 155 may be configured to receive and process a user query from user terminal 110. The user query may include a natural language search query, a special Boolean syntax query or a specially formatted query, or looser keyword query or a combination thereof. In some aspects, query processor 155 may process the user query to determine the parameters of the search and may cause a search to be executed in cooperation with search engine module 156. Search engine module 156 may be configured to execute the search based on the determined parameter from query processor 155. In embodiments, search engine module 156 may be an internal component of system 100, or may be an external search engine system. Search engine module 156 may return initial search results, which may include documents identified as relevant to the user query. As will be discussed in more detail below, one or more concept markers may be identified as relevant to the search, based on the initial search results, and may be included within the search results presented to the user. The presentation of the search results, which may include the initial search results from search engine module 156 and the identified relevant concept markers, may be configured by query processor 155 in accordance with aspects of the present disclosure. In embodiments, the identification of relevant concept markers may be performed in cooperation with re-ranker module 152 and CM recommender 151. It is noted that, as used herein, search results may include the initial search results obtained from search engine module 156, and/or may include the results presented to a user after relevant concept markers have been identified, and recommended, and selected.

As noted above, search results of a user query, e.g., initial search results, may include documents having concept markers associated therewith. The associated concept markers may be identified as relevant to the search. These concept markers, or a subset of these concept markers, may be presented and/or suggested to the user as part of the search results. CM recommender 151 may be configured to identify and/or classify concept markers to be provided as suggestions to the user in response to the user query. As also noted above, the suggested concept markers may provide a context aware mechanism to refine the search results by leveraging the user's awareness and knowledge of the search query and the system's knowledge of the stored content.

In one particular embodiment, CM recommender 151 may be configured to identify concept markers for suggestion based on the documents returned in response to the user query, e.g., the documents returned in the initial search results. In this case, CM recommender 151 may process the documents in the search results and may identify the concept markers assigned to the documents to generate an initial set of concept markers. In some aspects, CM recommender 151 may not process all documents in the search results, but may process a subset of the results based on a ranking of the documents. For example, CM recommender 151 may process the top n results, with n being a predetermined number (e.g., a number between 1 and 100). The processing of the search result documents may yield the concept markers assigned to the documents. In some aspects, the concept markers suggested to the user may not include every concept marker assigned to the search result documents, and may instead include a subset of the total set of concept markers identified as assigned to the search result documents. For example, CM recommender 151 may determine that the search result documents (whether the total set of search result documents or the top n documents) include 100 distinct assigned concept markers. However, the system may be configured to suggest a smaller number of concept markers to the user, e.g., 3-10 suggested concept markers. In this case, CM recommender 151 may truncate the list of identified concept markers to the predetermined number. In another embodiment, the user may be given an option to request more concept markers than the predetermined number. Alternatively, as discussed below, CM recommender 151 may operate to rank the identified concept markers, and the top concept markers, up to the predetermined number, may be suggested to the user.

After processing the initial documents in the search results to identify concept markers assigned to the documents, CM recommender 151 may apply a machine learning process, e.g., a classifier, to the identified concept markers in order to classify the concept markers as relevant or non-relevant to the query. In embodiments, models for the classifier may be trained using machine learning algorithms (e.g., gradient boosting trees, Logistic regression, Support Vector Machine (SVM), Naïve Bayes, random forests, neural networks, etc.).

In embodiments, a feature of CM recommender 151 may be configured to rank the identified concept markers based at least partially on a prevalence of the concept marker in the set of concept markers. In this case, a concept marker that appears more frequently in the set of identified concept markers may be ranked higher than a concept marker that appears less frequently. In some aspects, CM recommender 151 may apply a bias to the set of concept markers such that a concept marker assigned to a top ranked document may be weighted heavier, and thus ranked higher, than a concept marker assigned to a lower ranked document.

Another feature of CM recommender 151 for ranking the concept markers in the set may include determining a semantic relationship between terms in the user query and the concept markers. CM recommender 151 may be configured to convert the terms in the user query and the concept markers to a semantic vector space, and may calculate proximity to determine similarity in the meaning. In this case, CM recommender 151 may rank the concept markers based on their similarity to the query terms.

In another particular feature of CM recommender 151, suggested concept markers may be identified based on a thesaurus. For example, a concept marker may be considered relevant if a synonym of the concept marker or of one of the words of the concept marker appears in the query. In some aspects, the synonym may be based on an existing, human-curated lexical database.

Other features may include result-based calculations. For example, one feature may include determining the number of times a particular concept marker has been assigned to a document ranked in the top 10 documents. A concept marker with a higher number may be ranked higher. Another feature that includes result-based calculations may include calculating a TF_IDF score for the query concept markers. The TF_IDF score of the concept markers may provide an indication of the number of times a concept marker has been assigned to a document in the entire set of search result documents for the user query, normalized by the expected frequency based on the number of times the concept marker is assigned to a document in the document collection as a whole. CM recommender 151 may rank concept markers based on their TF_IDF score, with concept markers having a higher TF_IDF ranked higher than concept markers with lower TF-IDF scores.

Another feature for determining the relevance of a concept marker may include overlap calculations. For example, this feature may include determining the number of words that overlap between the query and the concept marker, determining the number of lemmatized words that overlap between the query and the concept marker, and/or determining the number of stemmed words that overlap between the query and the concept marker. Concept markers with higher number of overlaps may be ranked higher than those with lower number of overlaps.

Yet another feature for determining the relevance of a concept marker may include calculating a cosine similarity between a vector representation of the concept markers and the words in the query. Under this approach, an average embedding for each concept marker may be generated by averaging the embeddings for each word in the concept marker in the query. Similarly, an average embedding for each word in the query may be generated by averaging the embeddings for each word in the query. The cosine similarity between the average embedding vector for each concept marker and the average embedding vector for each word in the query may then be determined, and the results may then be averaged. CM recommender 151 may rank concept markers based on the respective calculated average cosine similarity measure. In some embodiments, the maximum cosine similarity is calculated instead of the averaging.

Still another feature of CM recommender 151 for determining the relevance of a concept marker may include calculating a matrix decomposition (e.g., Singular Value Decomposition (SVD)) for generating a semantic vector space. It is noted that matrix decomposition provides a way to convert new data points to an existing vector space. In this case, the semantic vector space may be built using concept markers, which may have little ambiguity, and then single words may be transferred into the concept markers space. This avoids the situation of building the semantic vector space using all the words, with or without concept markers, which may involve adding significant amounts of ambiguity and noise to the semantic vector space.

In aspects, the relevance scores of the concept markers in the subset of concept markers may be calculated. In one embodiment, the relevant scores of the concept markers in the subset of concept markers may be calculated by determining how the ranking of each document in the set of search result documents may be affected by each concept marker. In another embodiment, CM recommender 151 may re-rank the documents considering only query concept markers, and the resulting values stored based on the training performed and the model produced. CM recommender 151 may then consider a candidate concept marker, and may produce a vector by averaging a vector for just the candidate concept marker with a vector corresponding to the stored values associated with the query concept marker. In this case, extra weight is put on the candidate concept marker. Even when there is a larger number of concept markers in the query, the candidate concept marker may have equal weight in the combination. In yet another embodiment, CM recommender 151 may not determine how the ranking of each document in the set of search result documents may be affected by each concept marker, but may instead make the determination only for those documents that are highly likely to reach the top ranks. In one particular example, the re-ranking determination may be implemented for documents that are in the top 20 and/or may contain the candidate concept marker.

In implementations, CM recommender 151 may be configured to determine the impact of a concept marker. As used herein, impact of a concept marker may refer to the ability of the concept markers to provide users with access to a diverse set of documents when the concept marker is selected. In some aspects, the impact may be determined for a set of concept markers, in which case the impact of the set of concept markers may refer to the ability of the set of concept markers to provide users with access to a diverse set of documents when at least one concept marker of the set of concept markers is selected. In some aspects, CM recommender 151 may determine a set of suggested concept markers that maximizes a weighted average of the relevance and impact scores of the concept markers.

The impact of a concept marker may be determined based on at least one of several approaches. For example, in one approach, the impact of each concept marker in the set of concept markers may be determined with respect to every document in the set of search results documents. This approach, however, may take time and require substantial amounts of resources, such as reviewing resources. In some aspects, the set of concept markers may be filtered by removing any concept marker that appears only once, or any concept marker that appears in more than a predetermined percentage of times in the set of search result documents. For example, the set of concept markers may be filtered to remove any concept marker that appears in more than 30 of 100 search result documents. The remaining concept markers may then be ranked using the relevance ranking classifier and features discussed above. These operations by CM recommender 151 may result in a subset of concept markers that may be further processed.

The following illustrates an example of the configuration of CM recommender 151 to determine the impact of concept markers with respect to search result documents. Given the top n of the ranked search result documents, in the context of a candidate concept marker, the impact of a document ranked in the top n may be calculated as:

(1/rank of the document in the suggestion list)*(1/ number of times this document appears in top $n$ in other document rankings)

Thus, the impact of the concept marker may be simply the impact of its top n documents normalized by the maximum possible document impact so that it may fall into the range 0-1, as relevance does. The effect of the first term may be to put more weight on higher ranked documents. In the second term, "other document rankings" may refer to both the rankings of other candidate concept markers as well as the existing ranking of the documents. That is, the second term may be low if a document appears in a large number of the referenced lists, which may occur when the concept markers are highly redundant.

An importance weight (w) and thus the weighted average for impact versus relevance may be set and the following function may be optimized for a given concept marker:

Score=$w$*relevance(CM)+(1−$w$)*impact(CM)

Because the impact of any particular concept marker may be dependent on other concept markers, there may be no direct way to find the optimal value. Instead, the list of suggested concept markers may be filled out with those with the highest relevance and then each concept marker not in the suggestion list may be considered to determine if replacing the concept marker with one in the suggestion list may increase the value of the above function. If the value of the above function is increased, the concept marker is replaced in the list, and the process is continued. At each step, the above objective function is increased, and so the function converges, relatively quickly. In some cases, two iterations over the concept markers not in the list may be sufficient for the function to converge. The final suggestion list is sorted by relevance. It is further noted that CM recommender 151 may also be configured to re-rank the list of suggested concept markers in response to a selection of a suggested concept marker by the user. This re-ranking functionality of CM recommender 151 is discussed in more detail below.

The following illustrates an example showing a concept marker list at different values of w (impact):

Query="Can an individual deduct travel and legal cost for investigating a potential investment?"

w=0
  ['Away-from-home travel costs'
  'Foreign travel expenses'
  'Business travel'
  'Foreign travel'
  'Travel expenses']

w=0.5
  ['Foreign travel'
  'Away-from-home travel'
  'Travel expenses incurred'
  'Expense deduction'
  'Deductible costs']

w=1
  ['Foreign travel'
  'Travel expenses incurred'
  'Expense deduction'

'Deductible costs'
'Investment expenses']

As can be appreciated, when impact is low, all the concept markers may be focused on a narrow range of ideas related to travel (perhaps the most semantically distinct word in the query—travel). However, as the impact is increased in the example, a more diverse set of concept markers is obtained, including a concept marker related to investment and deductibility in general. It will also be appreciated that all concept markers are still relevant, even when most or all of the weight is biased towards impact.

CM recommender 151 may be configured to provide a limited set of suggested concept markers for presentation to the user, as noted above. In some aspects, the limited set may be expanded by the user to a larger set. The first limited set is determined based on the impact and relevance of the concept markers therein, as many users may not expand the initial concept marker list. In light of this, a further optimization may be performed to determine the set of initially visible concept markers that are presented to the user. A second optimization may also be performed to determine a set of non-visible concept markers based on the first optimization. For the second optimization, the concept markers in the visible set may be fixed but may still affect the impact of the concept markers being selected.

The concept markers recommended by CM recommender 151 may be provided for presentation to the user. As will be described in more detail below, the user may select at least one concept marker. The selection of at least one concept marker may cause the search results to be re-ranked. Re-ranker module 152 may be configured to re-rank the search results. In some aspects, the re-ranking of the search results may be in response to a user selecting a concept marker from the recommended selectable concept markers. Re-ranking the search results may include identifying and/or classifying the documents in the search results as relevant or irrelevant to the user query in light of the selected concept marker. In some embodiments, re-ranking the search results may also include re-ranking the concept markers in light of the selected concept marker and/or the re-ranking of the documents.

In some embodiments, re-ranking the search results may include determining a similarity between the concept markers identified in the query, which may be referred to herein as query concept markers, the user-selected concept markers, and the document representation with respect to concept markers. This similarity may be determined by machine learning techniques, e.g., using a classifier, which may be trained using different features as discussed below. In some embodiments, a classifier may identify documents that are relevant based on the initial user query and the user-selected concept marker. In other embodiments, re-ranker module 152 may analyze each document to determine whether the concept markers assigned to the document match any of the query concept markers. If there is a match, re-ranker module 152 may classify the document as relevant, otherwise, the document may be classified as irrelevant. Further, the determination as to the relevance of a document may be based on a combination of a semantic relationship between terms in the user query and information in the document's contents and/or metadata and concept markers assigned to the documents. It is noted that in some embodiments, re-ranker module 152 may be configured to rank the initial set of documents returned in response to the original query by applying the classifier to the set of documents in order to classify each document as either relevant or non-relevant to the query. The documents classified as relevant may be presented first, using their initial result scores for their ranking. The documents classified as non-relevant may be presented second, using their initial results scores for their ranking.

In some aspects, the documents in the search results, e.g., the results for presentation to a user, may be limited to a predetermined number. For example, the documents in the search results may be limited to n documents, where n may equal 100, 500 or 1000. In this case, even if more than the predetermined number of documents are identified as relevant, the search results may be capped to n. In some embodiments, re-ranker module 152 may simply truncate the results to the predetermined number of documents. The truncated results may be maintained for use in response to a subsequent concept marker selection by a user. In other embodiments, re-ranker module 152 may rank the documents in the search results, and the top documents, up to the predetermined number, may be returned for presentation to the user. It is noted that the ranking of the documents in the discussion that follows may be a ranking of the documents returned in response to the original query, e.g., the initial search results, or may be a re-ranking of the documents in response to a selection of a concept marker, as will be discussed in more detail below.

In some aspects, re-ranker module 152 may be configured to rank the search results based on a set of features. In some embodiments, the set of features may be used to re-rank the search results based on the user query and a user-selected concept marker. The re-ranking may also be performed using classification algorithms such as gradient boosting trees, random forest, etc.

In one feature of the set of features that re-ranker module 152 may use to rank the search results, for a given <query, document> pair, in which the relative rank of the document within the context of the query is being determined, the feature for the ranking may include calculating a percentage of query concept markers that are assigned to the document. In this case, a document that is determined to have assigned a higher percentage of the concept markers identified in the user query may be ranked higher than a document that includes a lower percentage of the query concept markers.

Another feature used by re-ranker module 152 for ranking the documents may include determining the average position of query concept markers in the document, and/or determining an average standard deviation of the position of query concept markers appearing in the document. This may be implemented at the sentence level of the document. Under this feature, re-ranker module 152 may capture where the query concept markers tend to appear in the document and how the query concept markers tend to be spread out over the document. For each concept marker in the query, the position (e.g., sentence indexes in the document) where the query concept marker appears in the document may be determined. For each query concept marker, the average, which may indicate expected position in the document, as well as the standard deviation of the position of the query concept marker in the document, may be calculated. An average over the query length and document length in terms of number of sentences in the document may be performed in order to remove any bias of query and document length.

Yet another feature used by re-ranker module 152 for ranking the documents in the search results may include calculating an Average and Maximum Pointwise Mutual Information (PMI) score of query concept markers in a document. This may be implemented at the sentence-level. This feature allows re-ranker module 152 to measure the dependency between query concept markers and concept markers assigned to the document. The PMI score may be used to measure the likelihood that a pair of concept markers tend to co-occur in a given context. In some aspects, a sentence may be considered as the context. A PMI score may be calculated for each query concept marker and each concept marker assigned to a document. Under this feature, documents with concept marker pairs having a higher PMI may typically be ranked higher than documents with concept marker pairs having a lower PMI.

Still another feature used by re-ranker module 152 for ranking the documents in the search results may include calculating an average frequency of query concept markers across the document. Under this feature, re-ranker module 152 may determine how often query concept markers appear in a document. This may involve counting the occurrences of query concept markers in the document, and then normalizing the count with respect to the query of the document (e.g., averaging the occurrences over the length of the user query and/or the length of document to determine the average frequency of query concept markers). Documents with higher frequencies of query concept markers may be ranked higher than documents with lower frequencies.

Another feature used by re-ranker module 152 for ranking the documents in the search results may include determining a probability distribution of query concept markers over title and paragraphs of a document. Under this feature, re-ranker module 152 may determine how often a particular concept marker that appears in the title and paragraphs of a document may tend to appear in the query. In this case, the rank of a document with assigned concept markers appearing in the title and paragraphs may be based on the probabilities of the concept markers also appearing in the query. Documents with higher probabilities may be ranked higher.

Yet another feature used by re-ranker module 152 for ranking the documents in the search results may include calculating a cosine similarity between a vector representation of query concept markers and concept markers assigned to the document to determine the semantic similarity between the query and the document. Under this feature, a continuous bag of words (CBOW) model may be trained using the contents of the document collections (e.g., sentences of the documents). In this example, each sentence may contain a list of concept markers. The cosine similarity between the average embedding vector of the query and the average embedding vector of the document may then be determined. Re-ranker module 152 may rank documents based on the respective calculated cosine similarity.

Still another feature used by re-ranker module 152 for ranking the documents in the search results may include calculating a term frequency-inverse document frequency (TF_IDF) score for the query concept markers. The TF_IDF score of the query concept markers provides indication of the relevance of each query concept marker to the document. Re-ranker module 152 may rank documents based on the TF_IDF score of the query concept markers with respect to the document. Documents for which the TF_IDF is higher may be ranked higher than those for which the TF-IDF score is lower. In some embodiments, a weighting mechanism may be used to adjust how a balance between the initial user query and user-selected concept markers is determined. In one particular implementation, the initial user query and user-selected concept markers may be weighed equally. In this case, for all concept markers in the initial user query, a feature vector may be built. Another feature vector may be built for the user-selected concept marker. A final feature vector may be built by calculating an average over the feature values of the user-selected concept marker feature vector and the initial user query feature vector.

It is noted that, although the discussion above with respect to the various features of the re-ranker module refers to each feature separately and individually, re-ranker module 152 may employ any combination of the above features for ranking the documents. Thus, re-ranker module 152 may base the ranking on a single feature, or may base the ranking on a combination of several features. It is further noted that re-ranker module 152 may also be configured to re-rank the documents in the initial search result in response to a selection of a suggested concept marker. This re-ranking functionality of re-ranker module 152 may be similar to ranking the search result in response to a selection of a suggested concept marker, as discussed above. The re-ranking functionality of re-ranker module 152 is discussed in more detail below.

Training module 154 may be configured to benefit from unsupervised learning and/or user activity with the system. For example, system 100 may be configured to learn from usage. In embodiments, after initial deployment, usage and/or query information may be harvested from query logs. System 100 may be configured to gather and store metrics on the user activity with the system and overall system performance. These metrics and analytics may be used by training module 154 for identifying concept markers and document selections that are successfully consumed by a user of user terminal 110. Whenever a user interacts with system 100, training module 154 may record information regarding user sessions. The information may include the query submitted by the user, concept markers selected by the user during the session, and documents selected or interacted with by the user. In some embodiments, training module 154 may request the user to provide an indication as to whether the selected document successfully answered the user's query. The indication may indicate the level of success of the selected document, e.g., highly relevant, moderately relevant, slightly relevant, etc. The collected metrics may be used by training module 154 to train the system and to further improve the concept marker-based search process of embodiments. Training module 154 may provide feedback to other components of system 100 (e.g., CM recommender 151, re-ranker module 152, CM assigner 153, and/or query processor 155) for processing documents newly added to the collections. For example, training module 154 may provide feedback to CM assigner 153 for initial concept marker assignments.

In some embodiments, training module 154 may be configured to learn from analysis that goes beyond analyzing user queries in isolation, but may learn from an entire interactive user session. For example, training module 154 may analyze a user session from the initial query to the end of the session, analyzing e.g., the initial query, selected concept markers, relevant documents, subsequent queries, etc. Training module 154 may use the collected information to identify associated opportunities for enhancing the identification of relevant documents based on a longer-view perspective of the user's information needs.

In one particular example of how training module 154 may benefit from unsupervised learning, training module 154 may be configured to track concept markers for particular queries for which the concept markers may be suggested and/or otherwise associated. Properties of the concept markers may be evaluated to determine if the properties meet respective thresholds. For example, the concept markers suggested for a query may be evaluated to determine if the concept markers are of sufficient quality, sufficient relevance, not overly general, not overly reductive, not overly similar to other concept markers suggested for the same query, etc. The evaluation may be performed manually by SMEs, or may be performed automatically (e.g., by AI modules, evaluation modules, etc.). If the evaluation of these properties shows that any number of properties of the concept markers suggested for the query do not meet the respective threshold (e.g., at least one property, multiple properties, or all properties do not meet the respective thresholds) the respective concept marker is designated as an ineffective concept marker. The designation of the concept marker as an ineffective concept marker may be indicated in a list of ineffective concept markers, which may be stored in database 180. The designation of an ineffective concept marker may be implemented within the context of a user query, within the context of the particular domain (e.g., jurisdiction, practice area, geographic area, etc.) associated with the user query and/or collection to be searched, or in isolation. During operations in accordance with the present disclosure, if a concept marker is identified (e.g., during generation, assignment, classification, and/or recommendation, as described herein) and that concept marker is determined to be an ineffective concept marker based on the list of concept markers, the search results may be further refined by excluding the concept marker from the process, or adjusting the ranking of the concept marker (or a document to which the concept marker may be assigned).

Figure 2:
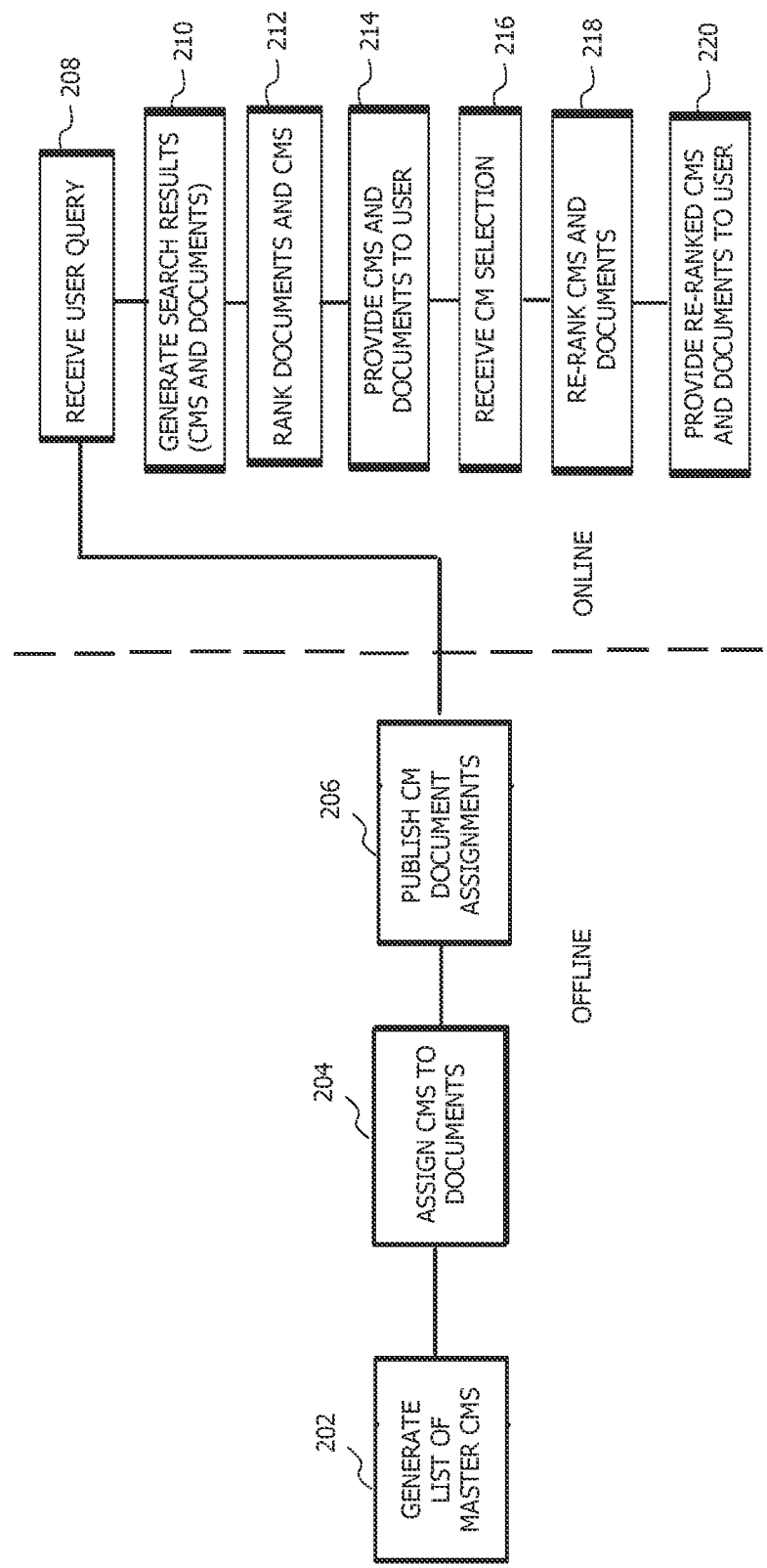
FIG. 2 shows a functional block diagram illustrating an example flow executed to implement aspects of the present disclosure.

Operations of system 100 to provide functionality in accordance with the present disclosure will now be discussed with respect to FIG. 2. FIG. 2 shows an example workflow illustrating blocks executed to implement aspects of the present disclosure. The procedure in the example blocks of FIG. 2 details steps for implementing an OFFLINE process and an ONLINE process. However, it will be appreciated that OFFLINE and ONLINE as discussed herein are not limited to processes being implemented or executed online or offline. Rather, the distinction is a functional one. For example, the OFFLINE process as used herein refers to a process that may include the creation and assignment of concept markers to associated documents, and may take place before the concept markers are published and/or deployed for use in the context of a search query by a user. The ONLINE process may refer to a process that includes providing search results and recommending associated concept markers to a user in response to a user query, and responding to a selection of a concept marker by the user, which may take place after deployment and publication of the concept markers to the system. In one sense, the OFFLINE/ONLINE distinction may refer to where a particular process is taking place, the former referring to a backend process with respect to the user, and the latter referring to a user-facing process.

With respect to the OFFLINE process, it is noted that, as discussed above, the exemplary operations illustrated and discussed herein may be performed by CM assigner 153 of embodiments. At block 202, a list of master concept markers may be generated. The list of master concept markers may be created based on relevant key concepts identified by SMEs or a number of other means. The relevant key concepts may be based on a jurisdiction, a geographic area, a topic, a particular context, context within a document, etc. Alternatively or additionally, the list of master concept markers may be created based on annotations to the metadata of documents in a particular collection of documents. The annotations may be made by SMEs and may include indications of relevant concepts associated with the contents of the particular documents. The documents in the collection may be processed to identify the relevant concepts annotated in the documents' metadata, which may be used to generate index files. The index files corresponding to a document collection may then be analyzed to generate a list of master concept markers.

At block 204, concept markers may be assigned to documents in the document collection. The assignment of the concept markers to the documents may include processing the documents in the particular collection, document-by-document, to determine what concept markers, from the master CM list, are to be associated with the particular document. The determination to assign a concept marker to a document may be based on more than a mere string match, and may include a determination as to whether a collection of relevant terms, associated with the concept marker, are present in the document in a specific form and/or pattern. In some cases, the assignment of concept markers may be done during ONLINE operations, and may be based on a user query. In these embodiments, a concept marker may be matched to a document based on a threshold, in which the comparison of relevant terms in the query to the document is deemed a match when the threshold is met or exceeded. Alternatively, an embedding-based comparison between the query and document may be applied to obtain a more semantic-based matching.

At block 206, the concept marker document assignments are published for use in a search query context. The publishing of the concept marker document assignments may include storing the concept marker assignments into a database of the system, such as database 180 of system 100. In some aspects, the concept marker assignment to a document may include adding a record to the metadata of a document indicating the concept marker assigned to the document. In these cases, each document in a collection may be preserved with a record of each concept marker assigned, as well as any key concept identified by an SME. Publishing the document assignments in these cases may include storing the documents in the collection, with the metadata records, in the database for subsequent use during the ONLINE process.

With respect to the ONLINE process, it is noted that, as discussed above, the exemplary operations illustrated and discussed herein may be cooperatively performed by various components of server 150, and may include query processor 155, re-ranker module 152, and CM recommender 151 of embodiments. Additionally, ONLINE operations will be described with additional references to FIGS. 3 and 4. FIGS. 3 and 4 illustrate an embodiment directed to a utility assistance program where a user may ask questions regarding a variety of topics and areas. In the example embodiment, one of the areas a user may ask questions about is regarding the tax code. As will be appreciated, the tax code is notoriously complicated and navigating it is extremely difficult. Moreover, identifying content relevant to a particular user question can also prove a challenge. In accordance with aspects of the present disclosure, embodiments herein provide functionality that allows the tax code and associated primary and editorial collections to be indexed with concept markers providing a context aware mechanism to not only identify relevant content associated with a user query, but also to refine the results with a higher degree of precision by leveraging the user's awareness and knowledge of the search query and the system's knowledge of the stored content. In addition, concept markers in accordance with the present disclosure help overcome the deficiencies and language gaps associated with user query-only approaches. It is also noted that although the following example is discussed in terms of a tax assistance engine, the techniques and system disclosed herein are equally applicable to any system where a user may submit a context-related query to obtain context related results.

At block 208, a user query is received. In some aspects, the user query may be received from a user terminal, such as user terminal 110 of embodiments. The user query may include a natural language search query, and may be input by a user via a GUI provided to the user. An example of a GUI and a user query in accordance with aspects of the present disclosure is shown in the GUI illustrated in FIG. 3. As shown in FIG. 3, GUI 300 is configured to provide search box 310 in which a user may enter search query 311. Search query 311 may be a query expressed as a natural language expression. It is appreciated that while search query 311 in the example embodiment shown in FIG. 3 is illustrated as a complete sentence in natural language, a natural language query need not be so precise. In embodiments, a natural language query may be expressed as a set of words, or may be a sentence that is not grammatically compliant. For example, while search query 311 is shown as "can I deduct mortgage interest on more than one home?", a search query may be expressed as "deduct mortgage interest more than one home". Search query 311 may be processed to determine the parameters of the search. The parameters of the search may be used to identify documents relevant to search query 311. In some aspects, search query 311 may also be processed to identify any concept markers present in search query 311. For example, search query 311 may be processed and determined to include concept marker 312, "mortgage interest."

At block 210 of FIG. 2, search results associated with the user query are returned. The search results may include documents ranked by probability of relevance, and a list of suggested concept markers. In a particular embodiment, the document search results may be determined based on the parameters of the search, and may not be based on query concept markers. For example, the user query may be executed by a search engine module, such as an external search engine, which may return the search results. Concept markers associated with the documents in the search results may be obtained by analyzing the documents. In other embodiments, the document search results may be determined at least in part based on query concept markers identified in the search query. In these embodiments, the documents in the collection may be analyzed to determine whether at least one concept marker of the query concept markers matches a concept marker assigned to the documents. Documents with matching assigned concept markers may be identified for the search results. In some aspects, only a subset of the identified documents are provided to the user in response to the query based on a predetermined number. It is again noted that search results may include the search result documents as well as recommended concept markers.

The concept markers to be included in the list of suggested concept markers may be identified by processing the documents in the search results documents. In accordance with aspects of the present disclosure, every document in the search results documents may have at least one concept marker assigned. The assigned concept markers of the documents in the search results documents may be included in the list of suggested concept markers.

At block 212, the search results documents and the suggested concept markers may be ranked. In embodiments, the ranking of the search result documents and the suggested concept markers may be performed separately. The ranking of the search results documents may be performed by an existing search engine ranking technique and/or may be based on a classifier using at least one of several features as discussed at length above. The ranking of the suggested concept markers may be based on a classifier using at least one of several features as discussed at length above. In particular, the suggested concept markers may be ranked based on relevancy and/or impact.

At block 214, the search results, including the ranked search results documents and the suggested concept markers, are provided to the user, via the GUI. For example, as shown in FIG. 3, GUI 300 may be configured to display at least a portion 330 of the search results documents and at least concept marker set 320. Portion 330 may include the top ranked document in the search results documents, or may include a predetermined number of the top ranked documents. In some aspects, GUI 300 may include a GUI element 350 configured to, upon selection, display further content of the search results documents, and may allow the user to browse through the entire search results documents in order of rank.

Concept marker set 320 may include the set of suggested concept markers identified at block 210 and ranked at 212. In some aspects, concept marker set 320 may be displayed in order of rank. Concept marker set 320 as shown in FIG. 3 is illustrated with every concept marker in the set visible to the user. A GUI element 313 may be provided which, upon selection, causes a subset of concept marker set 320 to be rendered invisible to the user, and the rest of the concept markers visible. In this case, the visible concept markers may be the top ranked concept markers, and the number of visible concept markers may be predetermined by the system or may be configured by the user. As shown in FIG. 4, concept marker set 420 is shown with only three concept markers visible to the user. GUI element 414 is provided which, upon selection, causes the invisible concept markers of concept marker set 420 to be rendered visible. GUI element 413 may include indicator 414 which indicates the number of invisible concept markers. For example, indicator 414 shows that one concept marker is invisible. In some embodiments, indicator 414 may indicate the at least number of invisible concept markers. For example, in these embodiments, indicator 414 may indicate that at least one concept marker is invisible.

As noted above, the concept markers of concept marker set 320 and concept marker set 420 are selectable. Thus, the user may select any of the visible concept markers to complement user query 311. At block 216, a user selection of a concept marker is received. For example, as shown in FIG. 4, a user may select concept marker 410 "persistent losses." The selection of the concept marker by the user causes the search results to be refined. In one aspect, the search results are refined in response to the selection of the concept marker by executing a new search query that is based on the original search query 311 and the selected concept marker. In this case, the system may identify new documents and new concept markers relevant to the new search query, in accordance with the description of the present disclosure.

In other aspects, a new search may not be executed. Instead, the documents, and the concept markers identified based on the original search query 311 are re-ranked based on the selected concept marker at block 218. In some aspects, a classifier may be applied to each document of the documents identified based on the original search query 311. The classifier may classify each document as a relevant or non-relevant document based on the original search query and/or the selected concept marker. If a document is classified as relevant, the document may be retained. If the document is classified as non-relevant, the document may be demoted to a place below the documents classified as relevant.

In some embodiments, the re-ranking of the documents based on the selected concept marker may be consistent with the description above with respect to the ranking of the initial search results, except that the re-ranking takes into account the selected concept marker. In particular, the re-ranker module may process the documents and, for each document, may determine whether and/or to what extent, the document satisfies the combination of the original search query and the selected concept marker. If the re-ranker module determines that the document may not satisfy the concept marker, and/or may not sufficiently satisfy the query, the document may not be promoted, and may in fact be demoted. However, if the re-ranker module determines that the document may satisfy the concept marker, and/or may sufficiently satisfy the query, the document may be promoted to a higher rank. With the search results documents re-ranked based on the selected concept marker, the set of concept markers is also re-ranked based on the newly ranked documents. In some aspects, the re-ranked documents are processed to determine assigned concept markers of the ranked documents. The resulting concept markers are determined in ranked order based on the ranked documents.

At block 220, the re-ranked search results documents and concept markers are provided to the user, via the GUI. For example, as shown in FIG. 4, in response to the selection of concept marker 410, concept marker set 420 is provided and displayed in GUI 300. Additionally, a portion of the re-ranked search result documents 430 may be displayed in GUI 300. As will be appreciated, re-ranked search result documents 430 represent a refined version of the original search query 311's search result, based on the context aware mechanism provided by the concept markers of embodiments and servers to leverage, to a higher degree of precision, the user's awareness and knowledge of the search query, represented in the selection of the concept marker, and the system's knowledge of the stored content, represented by the concept marker assignments and ranking, as well as the document ranking mechanisms described herein.

In some embodiments, multiple concept markers may be selected by the user. In these embodiments, the combination of the multiple concept markers may be implemented as a Boolean AND function or as a Boolean OR function, depending on whether higher precision is desired. In some aspects directed to multiple concept markers usage, once a concept marker is selected, the list of updated and re-ranked suggested concept markers may be restricted to concept markers which semantically imply the previously selected concept marker. For example, where a user selects a "tax" concept marker, a subsequent list of updated and re-ranked suggested concept markers may include a concept marker "income tax," where searching for "income tax" may involve searching for "tax."

Those of skill would further appreciate that the various illustrative logical blocks, modules, circuits, and algorithm steps described in connection with the disclosure herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure. Skilled artisans will also readily recognize that the order or combination of components, methods, or interactions that are described herein are merely examples and that the components, methods, or interactions of the various aspects of the present disclosure may be combined or performed in ways other than those illustrated and described herein.

Functional blocks and modules in FIGS. 1 and 2 may comprise processors, electronics devices, hardware devices, electronics components, logical circuits, memories, software codes, firmware codes, etc., or any combination thereof. Consistent with the foregoing, various illustrative logical blocks, modules, and circuits described in connection with the disclosure herein may be implemented or performed with a general-purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the disclosure herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, a cloud storage facility, or any other form of storage medium known in the art. An exemplary storage medium is coupled to the processor such that the processor can read information from, and write information to, the storage medium. In the alternative, the storage medium may be integral to the processor. The processor and the storage medium may reside in an ASIC. The ASIC may reside in a user terminal, base station, a sensor, or any other communication device. In the alternative, the processor and the storage medium may reside as discrete components in a user terminal.

In one or more exemplary designs, the functions described may be implemented in hardware, software, firmware, or any combination thereof. If implemented in software, the functions may be stored on or transmitted over as one or more instructions or code on a computer-readable medium. Computer-readable media includes both computer storage media and communication media including any medium that facilitates transfer of a computer program from one place to another. Computer-readable storage media may be any available media that can be accessed by a general purpose or special purpose computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code means in the form of instructions or data structures and that can be accessed by a general-purpose or special-purpose computer, or a general-purpose or special-purpose processor. Also, a connection may be properly termed a computer-readable medium. For example, if the software is transmitted from a website, server, or other remote source using a coaxial cable, fiber optic cable, twisted pair, or digital subscriber line (DSL), then the coaxial cable, fiber optic cable, twisted pair, or DSL, are included in the definition of medium. Disk and disc, as used herein, includes compact disc (CD), laser disc, optical disc, digital versatile disc (DVD), floppy disk and blu-ray disc where disks usually reproduce data magnetically, while discs reproduce data optically with lasers. Combinations of the above should also be included within the scope of computer-readable media.

Although the present invention and its advantages have been described in detail, it should be understood that various changes, substitutions and alterations can be made herein without departing from the spirit and scope of the invention as defined by the appended claims. Moreover, the scope of the present application is not intended to be limited to the particular embodiments of the process, machine, manufacture, composition of matter, means, methods and steps described in the specification. As one of ordinary skill in the art will readily appreciate from the disclosure of the present invention, processes, machines, manufacture, compositions of matter, means, methods, or steps, presently existing or later to be developed that perform substantially the same function or achieve substantially the same result as the corresponding embodiments described herein may be utilized according to the present invention. Accordingly, the appended claims are intended to include within their scope such processes, machines, manufacture, compositions of matter, means, methods, or steps.

The invention claimed is:

1. A method of refining search results, the method comprising:
    prior to receiving a user query:
        automatically assigning, by a concept marker assigner of a server comprising a processor and a memory, one or more concept markers from a first list of master concept markers to each document of documents in a database comprising a collection of documents, wherein assigning the one or more concept markers comprises processing metadata in each document of the documents to identify concepts in the documents;
    in response to receiving the user query from a user terminal:
        ranking, by a concept marker recommender of the server, identified concept markers and search result documents to generate a ranked list of the identified concept markers and ranked search result documents, wherein:
            the search result documents correspond to the documents generated in response to the user query,
            the identified concept markers correspond to the concept markers identified, by the concept marker recommender, in the search result documents;
        ranking the identified concept markers, wherein ranking the identified concept markers comprises determining a relevance of each identified concept marker to search terms in the user query,
        wherein determining the relevance of each identified concept marker comprises generating a semantic vector space comprised of the concept markers;
    in response to selection, by a user, of a concept marker from the ranked list of the identified concept markers, re-ranking, by a re-ranker module of the server, ranked concept markers in the ranked list of the identified concept markers and the ranked search result documents to generate re-ranked concept markers and re-ranked documents, wherein re-ranking the ranked concept markers in the ranked list of the identified concept markers and the ranked documents comprises determining a frequency with which the ranked concept markers appear in the ranked documents;
    providing the re-ranked concept markers and the re-ranked documents to the user via the user terminal;
    gathering, by a training module, metrics associated with system performance; and
    adjusting, by the concept marker assigner, assignment of the concept markers based on the metrics.

2. The method of claim 1, wherein generating the semantic vector space comprised of the search terms, the concept markers, or both comprises:
    calculating a matrix decomposition; and
    populating the semantic vector space with the concept markers.

3. The method of claim 1, wherein the semantic vector space comprises the search terms and the concept markers, and wherein determining the relevance of each of the identified concept markers to the search terms in the user query further comprises calculating a cosine similarity between the concept markers and the search terms, and wherein the method further comprises, prior to receiving the user query, storing, by the concept marker assigner, a second list of the concept markers in the database, wherein the second list of the concept markers comprises one or more concept markers from the first list of the concept markers.

4. The method of claim 1, wherein re-ranking, by the re-ranker module of the server, the ranked concept markers in the ranked list of the identified concept markers and the ranked documents to generate the re-ranked concept markers and the re-ranked documents comprises:
    calculating a cosine similarity between a vector representation of the ranked concept markers and the concept markers assigned to the ranked documents; and
    re-ranking the ranked concept markers based on the cosine similarity.

5. The method of claim 1, wherein re-ranking, by the re-ranker module of the server, the ranked concept markers in the ranked list of the identified concept markers and the ranked documents to generate the re-ranked concept markers and the re-ranked documents comprises:
    calculating a term frequency-inverse document frequency (TF-IDF) score for the ranked concept markers, wherein the TF-IDF score is indicative of a relevance of each ranked concept marker to one or more of the ranked documents.

6. The method of claim 1, wherein re-ranking, by the re-ranker module of the server, the ranked concept markers in the ranked list of the identified concept markers and the ranked documents to generate the re-ranked concept markers and the re-ranked documents comprises:
    calculating an average and maximum pointwise mutual information (PMI) score of the ranked concept markers, wherein the average and the maximum PMI score is indicative of a likelihood that a pair of the ranked concept markers co-occur in a given context.

7. The method of claim 1, wherein re-ranking, by the re-ranker module of the server, the ranked concept markers in the ranked list of the identified concept markers and the ranked documents to generate the re-ranked concept markers and the re-ranked documents comprises:
    determining a probability distribution of the ranked concept markers over parts of the ranked documents to correlate a first frequency with which the ranked concept markers appear in a ranked document with a second frequency with which the ranked concept markers appear in the user query.

8. The method of claim 1, wherein determining the frequency with which the ranked concept markers appear in the ranked documents comprises:
   counting occurrences of the ranked concept markers in each of the ranked documents; and
   averaging the occurrences over a first length of the user query and over a second length of each the ranked documents to determine an average frequency of the ranked concept markers.

9. A device for refining search results, the device comprising:
   a processor,
   a memory coupled to the processor, wherein the memory is configured to store a database comprising document collections, each document collection comprising a plurality of documents;
   a concept marker assigner, coupled to the processor and to the memory, wherein the concept marker assigner is configured to:
      process metadata in the plurality of the documents, and
      automatically assign concept markers to each document of the plurality of documents based on the metadata;
   a concept marker recommender, coupled to the processor and to the memory, wherein the concept marker recommender is configured to:
      classify the concept markers as being relevant to a query received via a user terminal or irrelevant to the query based on determining an importance weight metric at least indicating a relevance of the concept markers to terms in the query, present a first set of the concept markers, classified as being relevant, to a user associated with the user terminal for selection by the user, and
      rank a first set of search results to generate ranked search results; and
   a re-ranker module, coupled to the processor and to the memory, wherein the re-ranker module is configured to;
   determine a probability distribution of the first set of the concept markers over paragraphs of the documents comprising the ranked search results; and
   re-rank the ranked search results based on selection, by the user, of at least one concept marker of the first set of the concept markers, wherein the first set of search results include documents selected from the database based on the query.

10. The device of claim 9, wherein the concept marker recommender configured to classify the concept markers comprises the concept marker recommender configured to generate a semantic vector space comprised of the concept markers and terms of the query.

11. The device of claim 10, wherein the concept marker recommender configured to generate the semantic vector space comprised of the concept markers and the terms of the query further comprises the concept marker recommender configured to calculate a matrix decomposition to generate the semantic vector space.

12. The device of claim 9, wherein the importance weight metric comprises a relevance score indicative of the relevance of a concept marker of the concept markers to the query and an impact score indicating a diversity of documents associated with the concept marker.

13. A method of refining search results, the method comprising:
   ranking, by a concept marker recommender of a server comprising a processor and a memory, concept markers assigned to documents in a database comprising a plurality of document collections, wherein ranking the concept markers is based on an importance weight metric at least indicating a relevance of the concept markers to terms in a query received from a user terminal associated with a user;
   presenting, by the concept marker recommender, a first set of the concept markers, classified as being relevant, to a user associated with the user terminal for selection by the user;
   re-ranking, by the concept marker recommender, search results based on selection, by the user, of at least one concept marker of the first set of the concept markers, wherein the search results include documents selected from the database based on the query and the first set of concept markers corresponding to the documents, wherein re-ranking the search results comprises:
      determining a probability distribution of one or more concept markers of the first set of the concept markers over portions of the documents; and
      determining a frequency with which the one or more concept markers appear in the terms of the query; and
   providing re-ranked concept markers and re-ranked documents to the user via the user terminal.

14. The method of claim 13, wherein the importance weight metric includes a relevance score indicating a relevance of a concept marker of the concept markers to the query, and an impact score indicating a diversity of the documents associated with the concept marker, and wherein the relevance score varies inversely with the impact score.

15. The method of claim 13, wherein ranking the concept markers comprises generating a semantic vector space based on the concept markers and terms of the query.

16. The method of claim 15, wherein the semantic vector space is determined by calculating a matrix decomposition.

* * * * *